United States Patent [19]

Sawada et al.

[11] Patent Number: 5,278,665
[45] Date of Patent: Jan. 11, 1994

[54] FACSIMILE MACHINE USING ISDN BASIC INTERFACE

[75] Inventors: Mitsuji Sawada, Tama; Masahito Ohtani, Atsugi, both of Japan

[73] Assignee: Ricoh Company, Ltd., Tokyo, Japan

[21] Appl. No.: 444,954

[22] Filed: Dec. 4, 1989

[30] Foreign Application Priority Data

| Dec. 6, 1988 | [JP] | Japan | 63-306872 |
| Dec. 13, 1988 | [JP] | Japan | 63-312804 |
| Aug. 9, 1989 | [JP] | Japan | 63-204598 |

[51] Int. Cl.[5] .................. H04N 1/00; H04J 3/12
[52] U.S. Cl. .................. 358/442; 358/434; 370/110.1
[58] Field of Search ............ 358/400, 401, 405, 406, 358/434, 435, 436, 438, 439, 442, 476, 425, 404, 444, 440, 471, 407; 370/94.1, 94.2, 110.1, 60, 60.1

[56] References Cited

U.S. PATENT DOCUMENTS

| 4,888,766 | 12/1989 | Ogasawara | 370/110.1 |
| 4,961,185 | 10/1990 | Sawada | 358/442 |
| 4,970,723 | 11/1990 | Lin | 370/110.1 |
| 5,146,349 | 9/1992 | Mori | 358/407 |

FOREIGN PATENT DOCUMENTS

| 1-223855 | 9/1989 | Japan | 358/471 |
| 1-268237 | 10/1989 | Japan | 358/442 |

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

A facsimile machine in conformity with an information services digital network (ISDN) basic interface having a single signal channel and two information channels, includes a communication circuit, which has a first device of exchanging transmission and reception image signals with an ISDN through one of the two information channels (B-channels), a second device of exchanging the transmission and reception image signals with the ISDN through the other information channel, a third device of separately establishing the two information channels through the single signal channel, and a fourth device of controlling the first and second devices to independently exchange the transmission and reception image signals with the ISDN in parallel.

15 Claims, 5 Drawing Sheets

FIG. 3
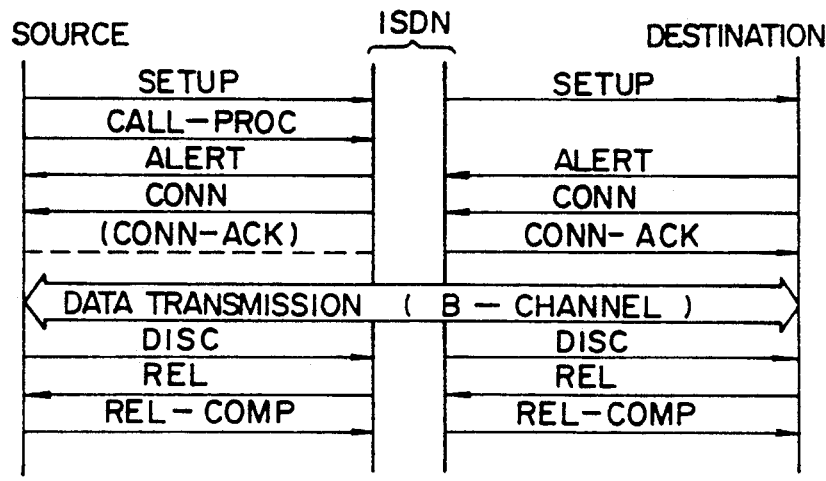
FIG.4(A)    FIG.4(B)
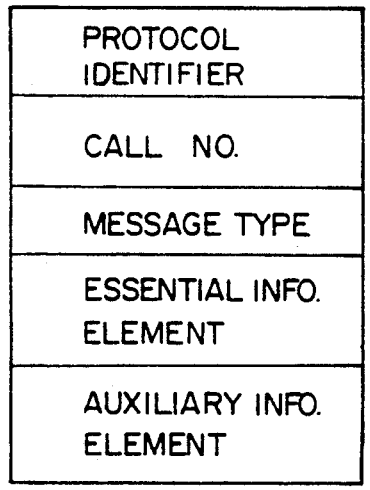    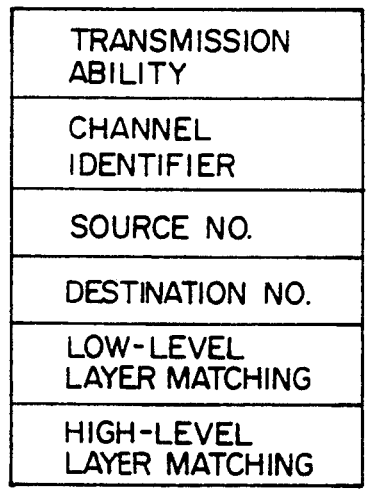
FIG. 4(C)
| CHANNEL IDENTIFIER |
|---| ced
FACSIMILE MACHINE USING ISDN BASIC INTERFACE

BACKGROUND OF THE INVENTION

The present invention generally relates to a facsimile machine and more particularly, to a facsimile machine which uses an ISDN (Integrated Services Digital Network) basic interface as a communication means.

Recently, ISDNs have been put in good condition, and data terminal equipment has been in practical use. A facsimile machine which performs image information transmission through an ISDN is a group-4 (G4) facsimile machine. Standard equipment functions thereof have been recommended by CCITT.

According to the CCITT recommendation to a group-4 facsimile machine, a single signal channel (D channel) for a line exchange processing to one subscriber line, and two information channels (B channels) for data transmission are multiplexed.

However, a conventional group-4 facsimile machine is equipped with only one transmission function. Therefore, it is impossible to perform image information transmission in which the two information channels are used at the same time or in parallel. Further, broadcast transmission which employs the group-4 facsimile machine is executed by the following procedure. First, a document image to be transferred is read and then stored in a memory. Second, a plural number of designated designations is serially called out, and the stored image is serially transferred to the called-out designations. Thus, it takes long to complete broadcast transmission.

SUMMARY OF THE INVENTION

Accordingly, a general object of the present invention is to provide a facsimile machine in which the aforementioned disadvantages are eliminated.

A more specific object of the present invention is to provide a facsimile machine capable of effectively and efficiently performing image information transmission using two information channels defined by the CCITT recommendation.

The above objects of the present invention are achieved by a facsimile machine in conformity with an information services digital network (ISDN) basic interface having a single signal channel and two information channels, comprising generating means for generating an image signal to be transmitted;

communicating means for sending a transmission image signal to a destination terminal coupled to an information services digital network (ISDN) and for receiving a reception image signal supplied from a source terminal coupled to the ISDN, the transmission image signal being the image signal supplied from the generating means; and recording means for recording an image formed by the reception image signal on a recording media, the communicating means including:

first means for exchanging the transmission and reception image signals with the ISDN through one of the two information channels;

second means for exchanging the transmission and reception image signals with the ISDN through the other information channel;

first control means for separately establishing the two information channels through the single signal channel; and second control means for controlling the first and second means so as to independently exchange the transmission and reception image signals with the ISDN in parallel.

The aforementioned objects of the present invention is also achieved by a facsimile machine in conformity with an information services digital network (ISDN) basic interface having a single signal channel and two information channels, comprising:

generating means for generating an image signal to be transmitted;

first storage means for storing a transmission image signal which is the image signal supplied from the generating means;

second storage means for storing a plurality of broadcast destination terminals to which the transmission image signal is to be transmitted;

communicating means for sending the transmission image signal to the broadcast destination terminals coupled to an information services digital network (ISDN) and for receiving a reception image signal supplied from a source terminal coupled to the ISDN; and recording means for recording an image formed by the reception image signal on a recording media, the communicating means including;

first means for exchanging the transmission and reception image signals with the ISDN through one of the two information channels, second means for exchanging the transmission and reception image signals with the ISDN through the other information channel, determining means for determining whether or not the two information channels are busy, first control means for establishing the two information channels through the single signal channel, selecting means for selecting one of the broadcast destination terminals stored in the second storage means when one of the two information channels becomes available, and second control means for reading out the transmission image signal from the first storage means and for transferring the readout transmission image signal to one of the first and second means relating to the available information channel, so that the transmission image signal is supplied, in parallel, to two of the broadcast destination terminals through the first and second means.

Additional objects, features and advantages of the present invention will become apparent from the following detailed description when read in conjunction with the accompanying drawings.

BRIEF DESCRIPTION OF THE DRAWINGS

FIG. 3 is a timing chart illustrating an ISDN transmission procedure;

FIG. 4A is a diagram illustrating a basic format of a call set-up message;

FIG. 4B is a diagram illustrating information elements contained in the call set-up message;

FIG. 4C is a diagram illustrating information elements contained in a call set-up acceptance message;

DESCRIPTION OF THE PREFERRED EMBODIMENTS

Figure 1:
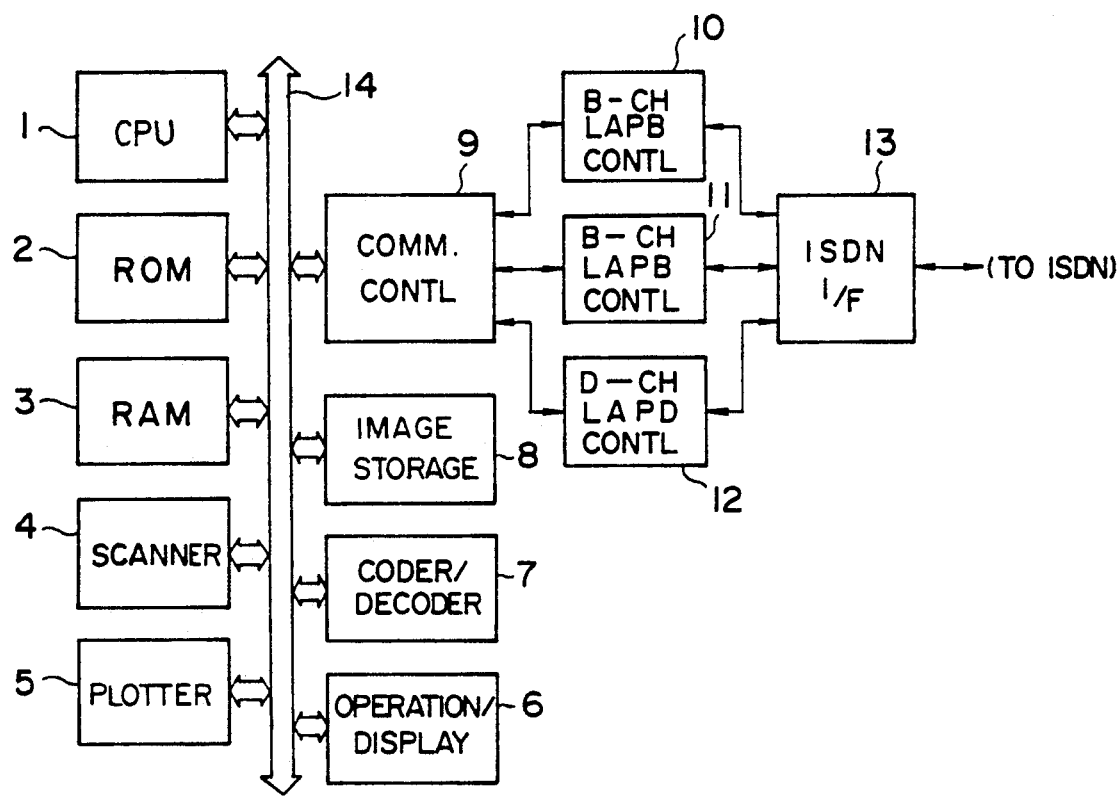
FIG. 1 is a block diagram of a facsimile machine according to a preferred embodiment of the present invention.
Figure 2:
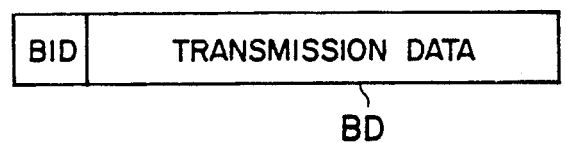
FIG. 2 is a diagram illustrating a format of data to be transferred.

Referring to FIG. 1, there is illustrated a facsimile machine according to the present invention. Referring to FIG. 1, a central processing unit (hereinafter simply referred to as a CPU) 1 controls the entire facsimile machine. A read only memory (hereinafter simply referred to as a ROM) 2 stores system programs and processing programs, which are executed by the CPU 1. Further, the ROM 2 stores various parameters used when executing the system programs and processing programs. A random access memory (hereinafter simply referred to as a RAM) 3 presents a work area of the CPU 1 and so on. A scanner 4 optically reads a document at a predetermined resolution and generates an image signal. A plotter 5 records an image on a recording medium such as paper at a predetermined resolution. An operation/display device 6 includes a plurality of keys and a display device such as a liquid crystal display, and is used for inputting data in the facsimile machine and displaying a variety of information. A coder/decoder (codec) 7 codes the image signal supplied from the scanner 4 to thereby generate a compressed image information in digital form, and decodes a compressed image information in digital form to reproduce the original image signal in analog form. An image storage device 8 stores compressed image information and so on.

A communication controller 9 executes a transmission control process based on the ISDN basic interface, and a predetermined group-4 facsimile transmission control procedure. B-channel LAPB (Link Access Procedure Balanced) controllers 10 and 11 separately realize a layer-2 transmission function relating to the information channels (B channels). A D-channel LAPD (Link Access Procedure for D-channel) controller 12 realizes a layer-2 transmission function relating to the signal channel (D channel). An ISDN interface circuit 13 connects the present facsimile machine to an ISDN (not shown), and realizes a layer-1 transmission function in conformity with the ISDN basic interface.

A system bus 14 mutually connects the CPU 1, the ROM 2, the RAM 3, the scanner 4, the plotter 5, the operation/display device 6, the coder/decoder 7, the image storage device 8, and the communication controller 9, and data is transferred therebetween through the system bus 14.

In the present facsimile machine, the image signal supplied from the scanner 4 is converted into the compressed image information in digital form, and is stored in the image storage device 8. Thereafter, the compressed image information is read out from the image storage device 8, and is then transferred to a destination facsimile machine.

At the time of reception of image information, the received image information is stored in the image storage device 8. After all image information is completely received, the received image information is decoded to generate the original image signal, which is supplied to the plotter 5, which reproduces the original image on paper.

On the other hand, as described previously, the present facsimile machine independently performs image information transmission through the two information channels. Thus, it is necessary for the facsimile machine to discern which one of the two information channels relates to transmission data transferred between the communication controller 9 and the image storage device 8. That is, it is necessary to discriminate transmission data relating to one of the two information channels from transmission data relating to the other information channel. For this purpose, channel identification information BID indicating one of the two channels to be used is added to the leading portion of transmission data BD equal to one block, which is once transferred.

A description is given of a basic data transmission procedure executed by ISDN terminal equipment such as a group-4 facsimile machine with reference to FIG. 3. First, a source terminal sends the ISDN a call set-up message SETUP and thereby requests a call set-up to a destination terminal. The ISDN sends the designated destination terminal the received call set-up message SETUP to thereby call out the destination terminal. Further, the ISDN sends the source terminal a call set-up acceptance message CALL-PROC, which lets the source terminal know status of setting up a call.

When detecting an incoming call, the destination terminal sends the ISDN a calling message ALERT. The ISDN sends the source terminal the received calling message ALERT to thereby let the source terminal know the start of calling the destination terminal. When the destination terminal responds to the incoming call, it sends the ISDN an answer message CONN. The ISDN sends the source terminal the received answer message CONN to thereby let the source terminal know that the destination terminal has accepted the call. Further, the ISDN sends the destination terminal an acknowledgement message CONN-ACK to thereby let the destination terminal know acknowledgement of the answer message CONN. In this manner, an information channel for the data transmission between the source and destination terminals is established. Thereby, the data transmission between the source and destination terminals is executed in accordance with individual transmission control procedures provided in the source and destination terminals. For example, data transmission based on the group-4 facsimile transmission control procedure is executed. When completing data transmission, the source terminal sends the ISDN a disconnect message DISC to thereby request the ISDN to release the information channel being used from this condition. The ISDN sends the received disconnect message DISC to the destination terminal to thereby let the destination terminal know that the information channel being used is released from this state. Then the destination terminal sends the ISDN a release message REL indicating completion of channel disconnection. The ISDN sends the source terminal the release message REL. When completing the release of channel, the source terminal sends the ISDN a release complete message REL-COMP. Then the ISDN sends the destination terminal to the received release complete message REL-COMP. At this time, the release of information channel stands, and the information channel used for data transmission between the source and destination terminals is completely released.

In the above-mentioned manner, an information channel is established, data transmission is carried out, and the information channel is released. Alternatively, at the end of the transmission procedure, it is possible for the destination terminal to send the disconnect message DISC to thereby request the information channel.

A description is given of the contents of the call set-up message SETUP and the contents of the call set-up acceptance message CALL-PROC with reference to FIGS. 4A through 4C.

As shown in FIG. 4A, each of the messages is composed of a protocol identifier, a call number, a message type, an essential information element, and an auxiliary information element. The protocol identifier functions to identify protocol specifications which define layer-3 call control messages, such as a format and a sequence. The call number indicates a call relating to the present message. The message type indicates the type of the message. The essential element is 0 or 1, or consists of a plurality of bits dependent on the message type. The auxiliary information element is 0 or 1, or consists of a plurality of bits dependent on current communication circumstance. The call number is set up by a terminal which generates a call.

As shown in FIG. 4B, the call set-up message SETUP has, as an essential information element, "transmission ability", and has, as auxiliary information elements, "channel identifier", "source number", "destination number", "low-level layer matching", and "high-level layer matching". The channel identifier information element is mainly used when the ISDN designates an information channel to a terminal. As shown in FIG. 4C, the call set-up acceptance message CALL-PROC has, as an auxiliary information element, "channel identifier".

Each of the aforementioned information elements is described below. The transmission ability information element defines an information transfer ability, a transfer mode, an information transfer rate, an information transfer style, and information indicative of a protocol of user's information. The information element of the information transfer ability represents the contents of the information to be transmitted, by selecting any from among an audio, non-limited digital information, limited digital information, 3.1 kHz audio, 7 kHz audio and video.

The channel identifier information element indicates which one of the channel and sub-channel in conformity with the basic interface is to be used. The transfer mode indicates whether an exchange to be used is a line exchange or a packet exchange. The source number information element represents the subscriber number of the source terminal, and the destination number information element represents the subscriber number of the destination terminal.

The low-level layer matching information element is used for checking whether or not it is possible to communicate with the destination terminal, and has the basic contents identical to those of the information element related to the transmission ability. Additionally, some detailed information may be included in the low-level layer matching information element.

The high-level layer matching information element is used for checking whether the source terminal matches the destination terminal, and indicates available terminal functions such as G2/G3 facsimile function, a G4 facsimile function, a mixed mode function, a teletex function, a videotex function, a telex function, and a message handling system function.

Figure 5:
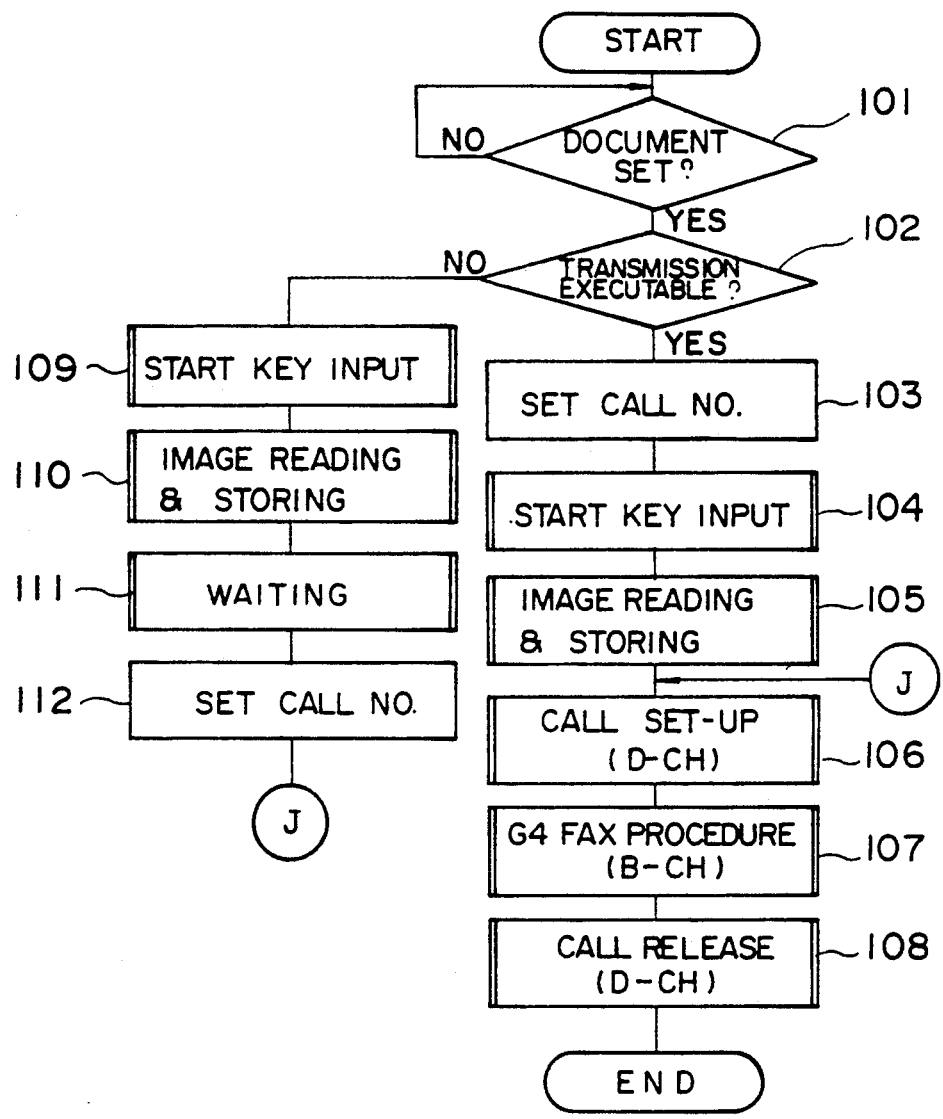
FIG. 5 is a flowchart of a procedure for transmission.

A procedure for executing image information transmission is described by referring to FIG. 5. An operator sets a document in the scanner 4. Then the CPU 1 and the communication controller 9 execute the following procedure. It is noted that no distinction between the CPU 1 and the communication controller 9 is provided for a step which is executed by a cooperation of the CPU 1 and the communication controller 9.

When the document is set in the scanner 4, the CPU 1 starts the procedure shown in FIG. 5 (step 101). The CPU 1 determines whether there is any available information channel which is in a transmission executable state (step 102). When there are one or more available information channels and thus the result at step 102 is YES, the CPU 1 sets up a call number used for the present image information transmission (step 103), and the facsimile machine waits for a manipulation of a start key (not shown) provided in the operation/display device 6 (step 104). When the start key is depressed, the CPU 1 makes the scanner 4 active so that the scanner 4 optically reads the document and generates a corresponding image signal. The image signal is coded through the coder/decoder 7, and corresponding compressed image information is stored in the image storage device 8 (step 105). Thereby, the facsimile machine is ready for transmission of the stored image information.

Then the communication controller 9 sets the call number determined at step 103 in the call number information element. Further, under the control of the communication controller 9, the subscriber number of the present facsimile machine is written in the source information element, and the subscriber number of the destination terminal is written in the destination information element. Moreover, related information is written in the transmission ability information element, the low-level layer matching information element, and the high-level layer matching information element. In this manner, the call set-up message SETUP is created by the communication controller 9.

Then the CPU 1 activates a transmission routine. The communication controller 9 makes the D-channel LAPD controller 12 active and sends the call set-up message SETUP to the ISDN through the D-channel LAPD controller 12 so that a call set-up procedure is started (step 106). In this call set-up procedure, the communication controller 9 refers to the channel identifier information element contained in the call set-up acceptance message CALL-PROC supplied from the ISDN, and determines an information channel to be used for the present transmission. When the destination terminal answers the incoming call and the information channel used for the present transmission is established, the communication controller 9 executes a group-4 facsimile transmission procedure (step 107) and the image information stored in the image storage device 8 is sent to the destination terminal.

When the present image information transmission is completed and the group-4 facsimile transmission procedure is ended, a releasing procedure at step 108 is executed in which the generated call is released and the present transmission routine is stopped.

On the other hand, when the operator sets a document in the scanner 4, if there is no available information channel and thus it is impossible to execute a requested image information transmission immediately, the result at step 102 is NO. In this case, steps 109 and 110 are executed in the same way as steps 104 and 105. Thereby, the facsimile machine is ready for image information transmission. Then the facsimile machine waits for the occurrence of an available information channel (steps 111). When an available information channel occurs, the CPU 1 determines a call number used for the present image information transmission (step 112), and the procedure proceeds to step 106. Thereafter, image information is transmitted.

Figure 6:
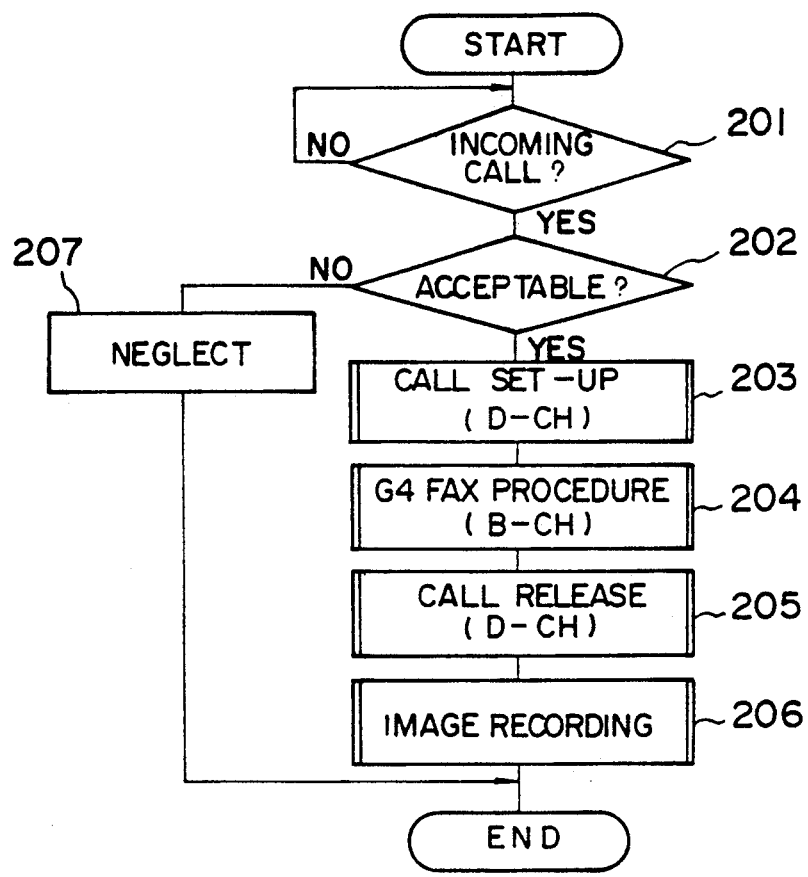
FIG. 6 is a flowchart of a procedure for reception.

A description is given of a procedure which is executed when the present facsimile machine is supplied with a call set-up message SETUP, and accepts the same, by referring to FIG. 6. When an incoming call from the ISDN is detected, the result at step 201 becomes YES. Thereby, the present procedure is made active. At step 202, the CPU 1 determines whether there is an available information channel, and determines whether it is possible to answer the incoming call by looking up the transmission ability information element, the low-level layer matching information element and the high-level layer matching information element which are contained in the received call set-up message SETUP. When the result at step 202 is YES, the CPU 1 generates a new reception routine and starts the same. Then the D-channel LAPD controller 12 executes a call set-up procedure by referring to the call number specified in the call set-up message SETUP and the signal channel, so that one information channel between the source terminal and the present destination terminal is established (step 203) When one information channel has been established, the communication controller 9 executes the group-4 facsimile transmission procedure, and image information received through the established information channel is stored in the image storage device 8. When the reception of image information is completed and the group-4 facsimile transmission procedure is ended, a procedure for releasing the generated call is executed so that the CPU 1 stops the reception routine for the present reception procedure (step 205). Then, the image information stored in the image storage device 8 is read out therefrom, and is then decoded to thereby generate the original image signal. This signal is supplied to the plotter 5, which records the original image on paper (step 206).

On the other hand, when the result at step 202 is NO, the communication controller 9 checks the contents of the call set-up message SETUP supplied from the ISDN. When the communication controller 9 makes a decision that it is impossible to answer the received call set-up message SETUP, it neglects this message (step 207), and the procedure ends.

When the operator starts image information transmission in a state where no information channel is being used (waiting state), the CPU 1 sets the call number to "1", for example, and informs the communication controller 9 of the same. Thereby, the communication controller 9 activates the D-channel LAPD controller 12. Then the communication controller 9 sets the informed call number "1" in the "call number" information element, and sends the ISDN the same together with other information elements through the activated D-channel LAPD controller 12. Thereby, the call set-up procedure is started.

When the communication controller 9 receives the call set-up acceptance message CALL-PROC from the ISDN, it sets the information channel to "B1" channel on the basis of the contents of the channel identifier information element contained in the received call set-up acceptance message CALL-PROC. In this case, according to the group-4 facsimile transmission procedure, the communication controller 9 activates the B-channel LAPB controller 10, through which various signals including group-4 facsimile transmission procedure signals are transferred. In the case where image information stored in the image storage device 8 is sent to a destination terminal, the CPU 1 adds the channel identification information BID indicative of "B1" to the leading portion of each block of the image information when it is read out from the image storage device 8 and is then transferred to the communication controller 9.

It is assumed that during a time when image information is being sent to a destination terminal through the information channel B1, the operator sends different image information to a different destination terminal. The operator sets a related document in the scanner 4. In this case, the information channel B2 is available. Thus, the CPU 1 sets the call number to "2"0 and executes a procedure for getting ready for transmission. When image information to be transmitted is completely stored in the image storage device 8, the CPU 1 generates a transmission routine for the requested transmission and starts the same. Then the communication controller 9 sets the call number informed by the CPU 1 in the call number information element, and sends the same to the ISDN together with other information elements through the activated D-channel LAPD controller 12. Thereby, the call set-up procedure is started. In this case, the call set-up acceptance message CALL-PROC indicates, as the information channel to be used, the information channel B2 which is a currently available information channel. The specified information channel B2 is stored in the RAM 3.

According to the group-4 facsimile transmission procedure, the communication controller 9 activates the B-channel LAPB controller 11, and various signals including the group-4 facsimile transmission procedure signals are transferred through the B-channel LAPB controller 11. In the case where image information stored in the image storage device 8 is sent to the destination terminal, the CPU 1 adds the channel identification information BID indicative of "B2" to the leading portion of each block of the image information which is read out from the image storage device 8 and is then transferred to the communication controller 9. That is, when the CPU 1 is informed of the completion of one block transfer data and a next block is requested, the CPU 1 adds data indicative of "B1" serving as the channel identification information BID to the leading portion of each block of the image information BD relating to the information channel B1, and adds data indicative of "B2" serving as the channel identification information BID to the leading portion of each block of image information BD with respect to the information channel B2. Thus, the communication controller 9 can determine whether image information transferred from the image storage device 8 relates to the information channel B1 or B2. As a result, two separate image information transmissions can be simultaneously executed.

If the operator sets a document in the scanner 4 in the case where the two information channels are being used, it is impossible to transfer data immediately. In this case, the facsimile machine performs an arrangement for transmission in advance and waits for the occurrence of an available information channel. That is, an image signal from the scanner 4 is coded through the coder/decoder 7 to generate corresponding compressed image information, which is then transferred in the image storage device 8. When an information channel becomes available, the setting of call number and information channel is executed. Then the image information transmission procedure is started in the same way as described previously.

When the facsimile machine is sending image information to a terminal through one of the two information channels, it is possible for this facsimile machine to receive, through the other information channel, image information relating to a different incoming call supplied from a different terminal. The communication controller 9 refers to the contents of the received call set-up message SETUP and determines whether it is possible to communicate with the different terminal. When communication with the different terminal is possible, the CPU 1 generates the reception routine for the different terminal and starts the same. In this way, it is possible for the facsimile machine to execute transmission and reception at the same time. When one block of the received image information is transferred from the communication controller 9 to the image storage device 8, the CPU 1 adds the channel identification information BID to the leading portion of each block.

On the other hand, when the facsimile machine which is completely in the waiting state receives the call set-up message SETUP from the ISDN through the D-channel LAPD controller 12, the communication controller 9 determines whether it is possible to answer the received call set-up message SETUP. When the facsimile machine is in the communication executable state, the communication controller 9 informs the CPU 1 of the contents of the specified information channel contained in the received call set-up message SETUP. Then the CPU 1 generates a reception routine for the present source terminal. Then the reception routine is started. Each time one-block of the received image information is transferred from the communication controller 9 to the image storage device 8, the CPU 1 adds the channel identification information BID to the leading portion thereof.

It is assumed that when the reception routine is being executed through one of the two information channels, the operator sets a document in the scanner 4. In this case, the other information channel is available. The CPU 1 sets the call number to be used in the same way as described before, and generates a transmission routine for the present document. In this procedure, when image information stored in the image storage device 8 is transferred to the communication controller 9 for every block, the CPU 1 adds the channel identification information BID to the leading portion of each block. In the above-mentioned manner, the facsimile machine executes transmission and reception at the same time.

In the state where the facsimile machine is receiving image information from a source terminal through one of the two information channels, when the call set-up message SETUP derived from a different terminal is received, the facsimile machine can receive image information through the other information channel. When the terminal functions of the present facsimile machine match those of the source terminal, the CPU 1 of this facsimile machine generates a reception routine for the source terminal and starts the call setting procedure. When received image information associated with the two information channels is transferred from the communication controller 9 to the image storage device 8 for every block, the CPU 1 adds the channel identification information BID indicating the corresponding channels to each of the blocks. In the above-mentioned way, the facsimile machine can simultaneously receive image information supplied from two different terminals.

The facsimile machine sends no response and neglects an incoming call, when two transmission routines, two reception routines, or one transmission routine and one reception routine are being executed at the same time. In this case, if the ISDN receives no answer message ALERT when a predetermined time has passed, it instructs the source terminal to release the call.

As described in the foregoing, the facsimile machine according to the present embodiment can execute two transmission/reception routines in parallel. For this reason, the efficiency in the use of facsimile machine is drastically increased, and additionally the efficiency in the use of transmission line is drastically increased.

In the aforementioned embodiment, the reception routine is completed and then an image corresponding to the received image information is recorded on paper through the plotter 5. Alternatively, received image information is transferred to the plotter 5 for every block and recorded on paper. In the case where two reception routines are executed in parallel, the recording of an image related to the first reception routine is completed, and thereafter, an image related to the second reception routine is recorded.

Figure 7A:
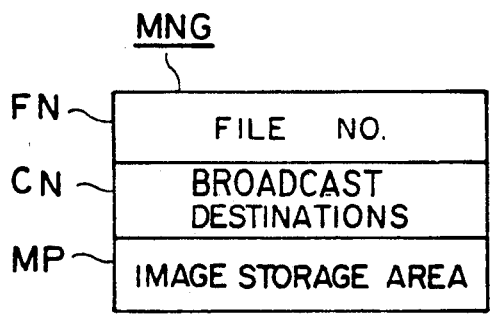
FIG. 7A is a diagram illustrating broadcast management information.

A description is given of a procedure for broadcast transmission in which the same image information is transmitted to a plurality of terminals. In this procedure, broadcast management information as shown in FIG. 7A is generated under the control of the CPU 1. The illustrated broadcast management information labeled MNG is generated for each broadcast transmission procedure, and stored in the RAM 3. The broadcast management information MNG is composed of a file number FN for discriminating the broadcast transmission information MNG from other information, broadcast destination information CN indicating destinations for broadcast transmission, and image storage area information MP indicating an area where image information to be transmitted is stored.

Figure 7B:
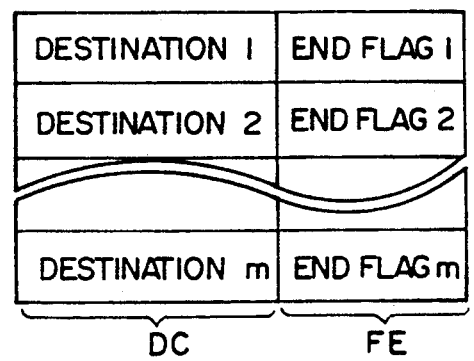
FIG. 7B is a diagram illustrating broadcast destination information.

FIG. 7B shows the broadcast destination information labeled CN, which is composed of destination information DC indicating destinations for broadcast transmission, and an end flag FE indicating the completion of broadcast transmission to each of the specified destinations.

The operator sets a document in the scanner 4 and inputs data necessary for broadcast transmission such as destinations through the operation/display device 6. The input data is stored in the RAM 3 under the control of the CPU 1. Further, the operator inputs additional information on transmission mode through the operation/display device 6. For example, when images on the document set in the scanner 4 are light, a specific mode for compensating light images is input. Then the operator inputs an instruction to start broadcast transmission through the operation/display device 6. The CPU 1 controls the scanner 4 to read the document, and instructs the coder/decoder 7 to encode an image signal supplied from the scanner 4 to thereby generate compressed image information. The compressed image information is then transferred to the image storage device 8 under the control of the CPU 1. Thereafter, the CPU 1 generates the aforementioned broadcast management information MNG on the basis of broadcast destinations and the storage area in which the compressed image information is stored in the image storage device 8. Thereby, the facsimile machine is ready for broadcast transmission. Then the CPU 1 starts a procedure for broadcast transmission shown in FIG. 8.

Figure 8:
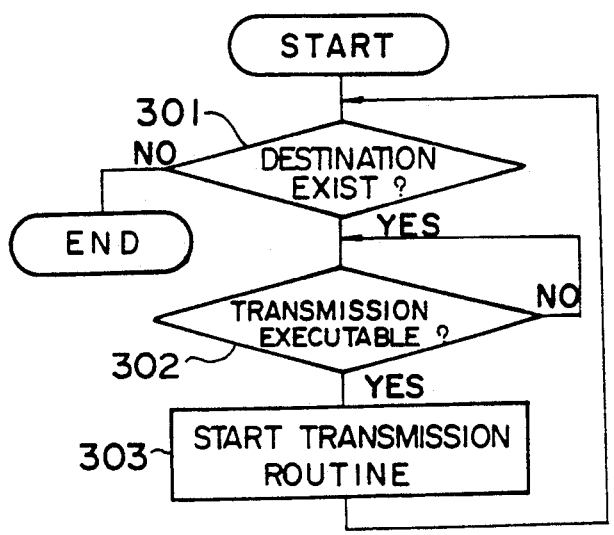
FIG. 8 is a flowchart illustrating a procedure for broadcast transmission.

Referring to FIG. 8, the CPU 1 determines whether there are one or more end flags FE in connection with the specified broadcast destinations contained in the broadcast management information MNG (step 301). When the result at step 301 is YES, one or more information channels are available. Then the CPU 1 determines whether one or more information channels are in the communication executable state (step 302). When the result at step 302 is YES, the CPU 1 generates the transmission routine for the present broadcast transmission and executes the same (step 303). Then the procedure shown in FIG. 8 returns to step 301.

Figure 9:
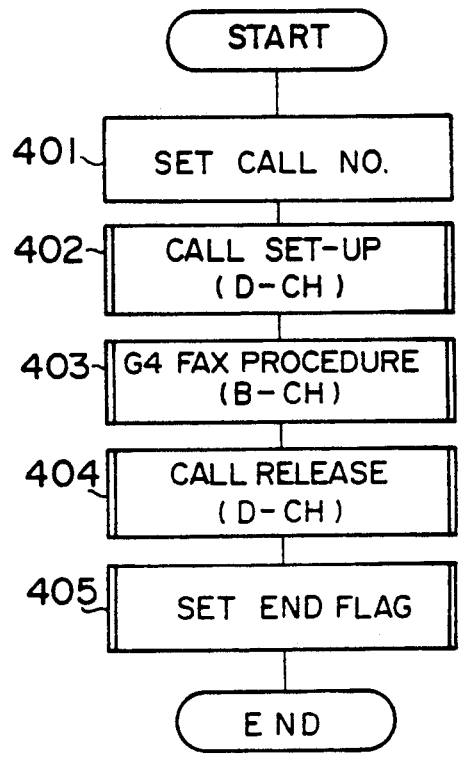
FIG. 9 is a flowchart illustrating a transmission routine.

On the other hand, when the result at step 302 is NO, the CPU 1 waits until an information channel becomes available (NO loop at step 302). When the CPU 1 starts the transmission routine at step 303, the CPU 1 and the communication controller 9 execute a procedure shown in FIG. 9.

First, the CPU 1 sets a call number to be used for the present broadcast transmission (step 401), and informs the communication controller 9 of the same. Then the communication controller 9 sets the call number in the call number information element, its own subscriber number in the source number information element, a subscriber number of one of the destination terminals taken from the broadcast destination information CN in the destination number information element, and related information in the transmission ability information element, the low-level layer matching information element, and the high-level layer matching information element. Thereby, the call set-up message SETUP is generated. Then the communication controller 9 makes the D-channel LAPD controller 12 active, and sends the ISDN the call set-up message SETUP therethrough. Thus the call setting procedure is started (step 402). The communication controller 9 sets an information channel to be used for the present broadcast transmission on the basis of the channel identification information contained in the call set-up acceptance message CALL-PROC supplied from the ISDN.

When the destination terminal sends the ISDN the call set-up acceptance message CALL-PROC, the selected information channel is established. Then the communication controller 9 executes the group-4 facsimile transmission procedure (step 403) to send the image information stored in the image storage device 8 to the destination terminal. During this procedure, the image data stored in the image storage device 8 is read out therefrom for every block, and the channel identification information BID is added to the leading portion of each block under the control of the CPU 1. When transmission of the image information is completed and then the group-4 facsimile transmission procedure is ended, the call releasing procedure is executed (step 404). By this procedure, the set-up call is released and the transmission routine is terminated. Additionally, the end flag FE associated with the destination information DC being processed is set (step 405). In the aforementioned manner, one transmission routine executes image information to one destination.

In the call set-up procedure, in case where the destination terminal does not respond to the call set-up message SETUP, call connection is released at this time. Thus, the group-4 facsimile transmission procedure is not executed and the end flag FE relating to the destination information DC of the destination is not set. A re-call set-up procedure to a destination terminal which does not respond to the call set-up message SETUP is executed after the transmission routines for the other destination terminals are completed. By this arrangement, re-calling to the specific destination terminal is prevented from being repeatedly performed.

When the operator specifies four broadcast terminals for example, the destination information DC relating to one of the terminals (first terminal) is selected. In this case, two information channels are available. The CPU 1 newly generates the transmission routine and starts the same. The CPU 1 determines a call number relating to transmission to the first destination terminal, and informs the communication controller 9 of the same. The communication controller 9 sets the informed call number in the call number information element, its own subscriber number in the source number information element, the subscriber number of the first destination terminal in the destination number information element, related information in the transmission ability information element, the low-level layer matching element information element and the high-level layer matching information element. Thereby, the call set-up message SETUP for the first destination is generated. The call set-up message SETUP is transmitted to the ISDN through the D-channel LAPD controller 12.

While the transmission routine for the first destination (hereinafter referred to as a first transmission routine) being executed, the other information channel is available. The CPU 1 newly generates the transmission routine for a second destination (hereinafter referred to as a second transmission routine) and starts the same. Hence, the first and second transmission routines are simultaneously executed. In the same way as the first transmission routine, the second transmission routine generates the call set-up message SETUP to the second destination terminal, and starts the call set-up procedure.

When the information channel B1 is allocated to the first transmission routine, the channel identification information BID indicative of the information channel B1 is added to the leading portion of each block of the image information relating to the first destination terminal. In this case, the information channel B2 is allocated to the second transmission routine, and the channel identification information BID indicative of the information channel B2 is added to each block of the image information relating to the second destination terminal. The communication controller 9 can discriminate image information relating to the information channels B1 and B2 from each other.

When two transmission routines are independently be executed at the same time, there is no available information channel. Thus, the transmission routine for the third destination terminal (hereinafter referred to as a third transmission routine) and the transmission routine for the fourth destination terminal (hereinafter referred to as a fourth transmission routine) are in the waiting state.

When the first transmission routine is completed, one available information channel is obtained. Thus, the third transmission routine is generated and started.

Then, no information channel becomes available again. Therefore, the fourth transmission routine waits for the release of information channel. The information channel B1 is allocated to the third transmission routine. Thus, the channel identification information BID indicating the information channel B1 is added to the leading portion of each block of the image information relating to the third transmission routine.

When the second transmission routine is completed, the information channel B2 becomes available. Therefore, the fourth transmission routine is started. Since the information channel B2 is allocated to the fourth transmission routine, the information identification information BID indicating the information channel B2 is added to the leading portion of each block of the image information relating to the fourth transmission routine.

In case where the second destination terminal does not respond to the call set-up message SETUP and call connection is released in the call set-up procedure relating to the second transmission routine, the second transmission routine is temporarily stopped, and the third transmission routine is generated and started. When the fourth transmission routine is completed, the second transmission routine is executed again and image is transferred to the second destination terminal. In the above-mentioned procedure, it is alternatively possible to execute the second transmission routine again.

In the aforementioned way, the transmission routines through the two information channels B1 and B2 are executed in parallel. Since two transmission routines can independently be executed at the same time, the present parallel transmission takes a time half of that for conventional sequential transmission.

In the embodiment shown in FIG. 1, two B-channel LAPB controllers 10 an 11 are provided. Alternatively, it is possible to use a single B-channel LAPB controller executing layer-2 controls relating to two information channels B1 and B2.

It is noted that time-specified broadcast transmission can be executed in the same way. The broadcast management information, broadcast processing and transmission routines are not limited to those as described previously. Of course, the aforementioned facsimile machine can execute transmission procedure other than broadcast transmission.

The present invention is not limited to the aforementioned embodiments, and variations and modifications may be made without departing from the scope of the present invention.

What is claimed is:

1. A facsimile machine in conformity with an information services digital network (ISDN) basic interface having a single signal channel and two information channels, comprising:

generating means for generating an image signal to be transmitted;

communicating mans for sending a transmission image signal to a destination terminal coupled to an information services digital network (ISDN) and for receiving a reception image signal supplied form a source terminal coupled to said ISDN, said transmission image signal being said image signal supplied from said generating means; and recording means for recording an image formed by said reception image signal on a recording medium, said communicating means including:

first means for exchanging said transmission and reception image signals with said ISDN through one of said two information channels;

second means for exchanging said transmission and reception image signals with said ISDN through the other information channel;

first control means for separately establishing said two information channels through said single signal channel; and second control means for controlling said first and second means so as to independently exchange said transmission and reception image signals with said ISDN in parallel and for generating first and second transmission procedures respectively related to said first and second means when the two information channels are used for simultaneously transmitting transmission image signals in parallel in accordance with said first and second transmission procedures so that the first nd second means simultaneously transmit the transmission image signals to the ISDN through the two information channels in parallel.

2. A facsimile machine as claimed in claim 1, further comprising identification data adding means for adding identification data to said transmission image signal, wherein said identification data indicates which one of said two information channels is to be used for transmitting said transmission information signal.

3. A facsimile machine as claimed in claim 2, further comprising determining means for determining whether or not each of said two information channels is busy, and activating means for activating one of said first and second means which relates to available one of said information channels, wherein said identification data adding means adds said identification data indicative of said available information channel to said transmission image signal.

4. A facsimile machine as claimed in claim 1, further comprising storage means for storing said transmission image signal supplied from said generating means and said reception image signal supplied from said source terminal.

5. A facsimile machine as claimed in claim 4, further comprising recording control means for controlling said storage means so as to store said reception image signals which are separately supplied from said two information channels in parallel, for controlling said storage means so as to transfer one of said reception image signals stored in said storage mans to said recording means and for transferring the other reception image signal stored in said storage mans to said recording means when said one of the reception image signals has been transferred to said recording means.

6. A facsimile machine as claimed in claim 4, further comprising storage control means for controlling said storage means so as to store said transmission image signal supplied form said generating means when said two information channels are both busy and for transferring said transmission image signal stored in said storage means to one of said two information channels when said one of the two information channels becomes available.

7. A facsimile machine as claimed in claim 5, wherein said reception image signal is composed of blocks, and is transferred to said storage means for every block, and wherein identification data indicating which one of said two information channels relates to said reception image signal is added to a leading portion of each of said blocks.

8. A facsimile machine as claimed in claim 6, wherein said transmission image signal is composed of blocks, and is transferred to said storage means for every block, and wherein said facsimile machine comprises identification data adding means for adding identification data to each of said blocks of said transmission image signal, and said identification data indicates which one of said two information channels relates to said transmission image signal.

9. A facsimile machine as claimed in claim 1, wherein said facsimile machine is a group-4 facsimile machine recommended by CCITT.

10. A facsimile machine in conformity with an information services digital network (ISDN) basic interface having a single signal channel and two information channels, comprising:
  generating means for generating an image signal to be transmitted;
  first storage means for storing a transmission image signal which is said image signal supplied form said generating means;
  second storage mans for storing information related to a plurality of broadcase destination terminals to which said transmission image signal is to be transmitted;
  communicating means for sending said transmission image signal to said broadcast destination terminals coupled to an information services digital network (ISDN) and for receiving a reception image signal supplied form a source terminal coupled to said ISDN; and
  recording means for recording an image formed by said reception image signal on a recording media, said communicating means including:
  first means for exchanging said transmission and reception image signals with said ISDN through one of said two information channels,
  second means for exchanging said transmission and reception image signals with said ISDN through the other information channel,
  determining means for determining whether or nor said two information channels are busy,
  first control means for establishing said two information channels through said single signal channel,
  selecting means for selecting two of said broadcast destination terminals stored in said second storage means when said two information channels becomes available, and
  second control means for reading out said transmission image signal from said first storage means and for transferring said readout transmission image signal to said first and second means, so that said transmission image signal is simultaneously supplied, in parallel, to said two of said broadcast destination terminals through said two information channels by said first and second means.

11. A facsimile machine as claimed in claim 10, further comprising identification data adding means for adding identification data to said transmission image signal, wherein said identification data indicates which one of said two information channels is to be used for transmitting said transmission information signal.

12. A facsimile machine as claimed in claim 11, further comprising determining means for determining whether or not each of said two information channels is busy, and activating means for activating one of said first and second means which relates to available one of said information channels, wherein said identification data adding means adds said identification data indicative of said available information channel to said transmission image signal.

13. A facsimile machine as claimed in claim 10, further comprising recording control means for controlling said first storage means so as to store said reception image signals which are separately supplied from said two information channels in parallel, for controlling said first storage means so as to transfer one of said reception image signal stored in said first storage means to said recording means and for transferring the other reception image signal stored in said first storage means to said recording means when said one of the reception image signals has been transferred to said recording means.

14. A facsimile machine as claimed in claim 10, wherein said facsimile machine is a group-4 facsimile machine recommended by CCITT.

15. A facsimile machine as claimed in claim 10, wherein said transmission and reception image signals is compression-oriented coded data.

* * * * *

UNITED STATES PATENT AND TRADEMARK OFFICE
CERTIFICATE OF CORRECTION

PATENT NO.   : 5,278,665
DATED        : January 11, 1994
INVENTOR(S)  : Mitsuji SAWADA, et al.

It is certified that error appears in the above-indentified patent and that said Letters Patent is hereby corrected as shown below:

On the title page, Item [30], the 3rd Foreign Application Priority Data should read as follows:

--Aug. 9, 1989 [JP]  Japan ................ 1-204598--

Signed and Sealed this

Twenty-sixth Day of July, 1994

Attest:

BRUCE LEHMAN

*Attesting Officer*            *Commissioner of Patents and Trademarks*